Jan. 16, 1940.   C. W. STRATFORD   2,187,466
APPARATUS FOR TREATING HYDROCARBON OILS
Filed April 8, 1938
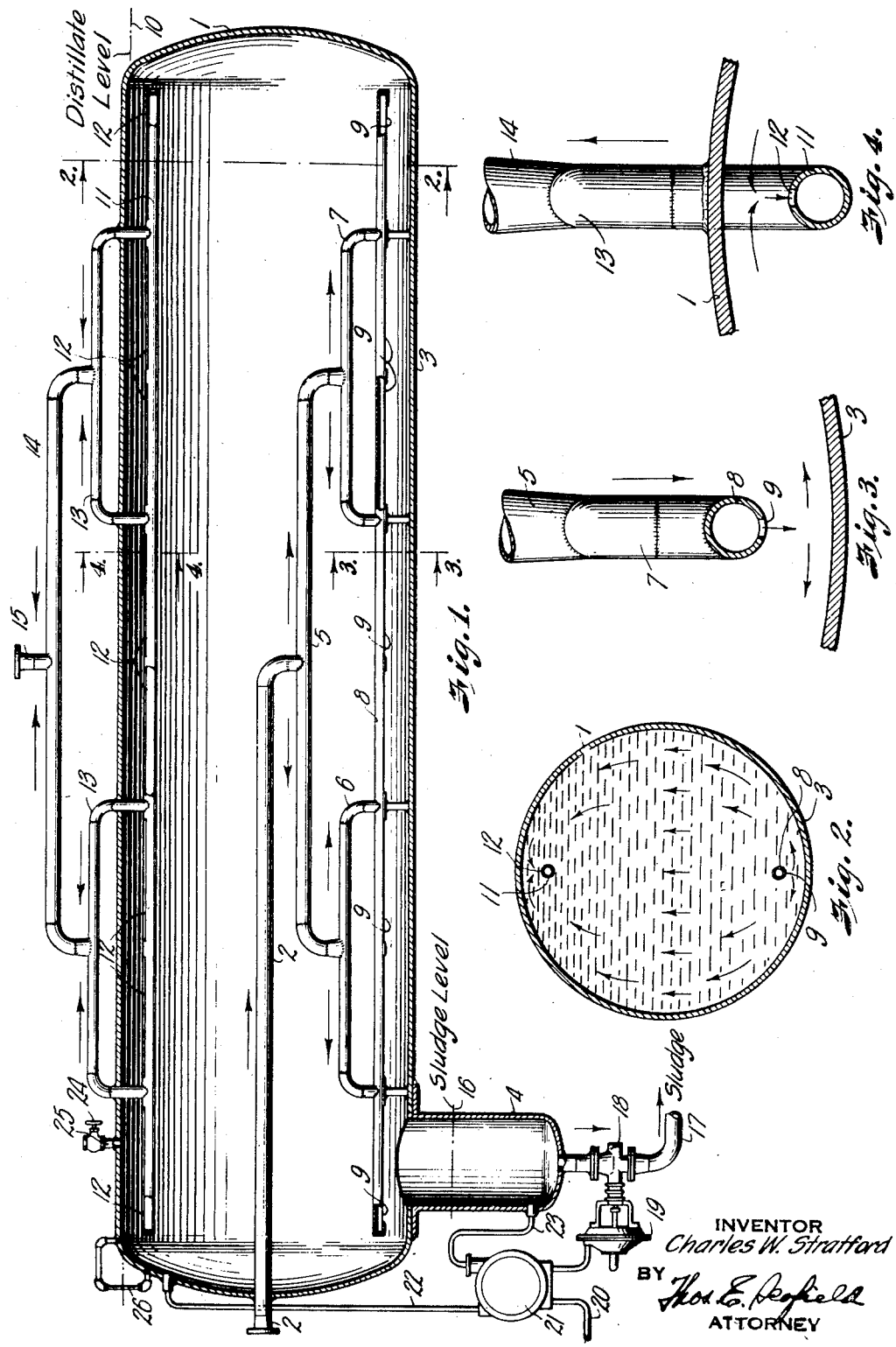
INVENTOR
Charles W. Stratford
BY
ATTORNEY Patented Jan. 16, 1940

2,187,466

UNITED STATES PATENT OFFICE 2,187,466

APPARATUS FOR TREATING HYDROCARBON OILS

Charles W. Stratford, Kansas City, Mo., assignor to Stratford Development Corporation, Kansas City, Mo., a corporation of Delaware Application April 8, 1938, Serial No. 200,923

2 Claims. (Cl. 210—51)

My invention relates to apparatus for treating hydrocarbon oils and more particularly to settling apparatus.

In the treatment of hydrocarbons to eliminate sulphur and other objectionable compounds, the hydrocarbon oil is given a chemical treatment with an agent which has selective chemical affinity or physical solvent powers or adsorptive characteristics with reference to the material to be removed.

After contact, the treating agent must be removed from the hydrocarbon oil treated. One method employed by the art in so removing the treating agent is to employ gravity differences and permit the heavier of the two components to settle out of the mixture.

By way of example only and not by way of limitation, I will describe my apparatus with reference to the treating of hydrocarbon oil and more particularly hydrocarbon distillate with acid. It is to be understood, however, that this is by way of illustration only and not by way of limitation, as my apparatus may be employed for settling generally.

One object of my invention is to provide a settler in which a constant deceleration of the admixture to be settled is accomplished whereby heavy particles will drop out of the admixture by gravity.

Another object of my invention is to provide means for segregating the separated material to prevent readmixture with the other component.

Other and further objects of my invention will appear from the following description.

In the accompanying drawing which forms part of the instant specification and is to be read in conjunction therewith and in which like reference numerals are used to indicate like parts in the various views;

Figure 1 is a sectional elevation of a settler embodying my invention.

Figure 2 is a sectional view taken on a line 2—2 of Figure 1.

Figure 3 is an enlarged sectional view of a detail taken on a line 3—3 of Figure 1.

Figure 4 is an enlarged sectional view of a detail taken on a line 4—4 of Figure 1.

The hydrocarbon oil, admixed with sulphuric acid of any other suitable treating agent, is introduced into the settler vessel 1 through an inlet pipe 2. The settler vessel may be of any suitable shape and is shown as a horizontal, substantially cylindrical vessel. The bottom 3 of the vessel 1 is inclined, the high side being toward the right as viewed in the figure, and the low side being toward the left as viewed in Figure 1. Adjacent the lowest point of the bottom 3 I provide a sump or well 4, communicating with the vessel 1. The inlet pipe 2 is connected to a manifold 5 which is in turn connected to manifolds 6 and 7, which are in turn connected to manifold 8. Manfold 8 is closed at its ends and is provided along its bottom with a plurality of outlet openings 9, spaced therealong.

It will be obvious that the velocity or rate of flow of the inlet mixture will progressively decrease until it is discharged from the outlet openings 9, which may be slots or holes. This progressive decrease or deceleration of the rate of flow of the mixture to be separated permits the heavier particles to settle and coalesce. It will be noted that the outlet openings 9 are adjacent the bottom wall 3 of the settler and that, in flowing upwardly, the cross sectional area progressively increases. This progressive increase of the space into which the mixture to be settled flows permits a constant and progressive deceleration of flow, enabling ready settling without turbulence or readmixture. The inlet stream, for example, leaving inlet pipe 2, flows in two directions through pipe 5, thus substantially halving the velocity through both branches of manifold 5. From manifold 5, the mixture to be separated flows into manifolds 6 and 7 in which the introduced material may again flow in two directions, thus again decreasing the velocity of flow. From manifolds 6 and 7 into manifold 8 the mixture to be settled is again permitted to flow in two directions, thus again decreasing the velocity of flow. The cross sectional area of the settler being circular in shape will progressively increase until the diameter is reached, so that there is a constant and progressive deceleration of the mixture to be settled. The mixture leaving outlet openings 9 moves at such low velocity that no sensible mixing effect of oil and acid will occur. The operation is such that the entire vessel is filled with distillate and I provide means to insure that the vessel is operated distillate-full. The distillate level is indicated in Figure 1 by the reference numeral 10. The entire cross section of the vessel 1 in terms of square footage exposed to the force of gravity will thus become effective for the purpose of bringing about separation by gravity of the heavier liquid from the lighter liquid.

Adjacent the top of the vessel in a zone, where substantially all separation has taken place between the heavier and lighter liquids, is positioned an outlet manifold 11, provided with a plurality of outlet openings or slots 12. These outlet openings are upwardly directed so that suction is always taken from the lighter liquid, substantially free of particles of heavier liquid. The effluent liquid passes into the outlet manifold 11 and thence at a low velocity and at a uniform rate from one end of the vessel to the other, in such a manner as to cause no localized zone of high velocity which would tend to cause mixing. A pair of manifolds 13 are connected to the manifold 12. The manifolds 13 are in turn manifolded by a manifold 14 to which the outlet pipe 15 is connected.

The heavier separated liquid flows along the inclined bottom 3 into the sump 4.

In the acid treating of hydrocarbon oils, if the acid is permitted to remain in contact with the oil for too great a length of time, the acid tends to polymerize some of the unsaturated hydrocarbons. The arrangement is such that the acid sludge level is maintained within the sump 4 so that the interface between the sludge and the distillate will be kept at a minimum, thus minimizing any interreaction between the separated sludge and the distillate. The sludge level is indicated in Figure 1 by the reference numeral 16.

In order to insure the maintaining of a sludge level within the sump 4, I provide a level control for controlling the eduction of the sludge from the settler. The sludge is withdrawn from the sump 4 through a sludge withdrawal pipe 17 which is controlled by a valve 18. The valve, in turn, is controlled by a diaphragm 19 which is in effect a servomotor, actuated by compressed air entering through pipe 20. The air in pipe 20 is controlled by a valve within the level control instrument 21. This valve is actuated in a manner known to the art, by the differential pressure existing adjacent the top of the settler and that existing at a point within the sump. A pipe 22 provides communication between a point adjacent the top of the settler and the level control, while a pipe 23 provides communication between a point adjacent the bottom of the sump and the level control. The hydrostatic pressure communicated through pipe 23 to the level control instrument 21 is the integral of the hydrostatic pressure exerted by the column of sludge and the hydrostatic pressure of the distillate thereabove. The hydrostatic pressure communicated through pipe 22 is the equivalent of a column of distillate. It will be apparent therefore that, when the sludge level rises within the sump 4, a greater pressure will be exerted through pipe 23 upon the level control instrument, while if the sludge level drops a lesser pressure will be communicated to the level control instrument 21. When the pressure communicated through pipe 23 increases, the arrangement is such that the level control instrument 21 will permit a greater amount of compressed air to pass through pipe 20 upon diaphragm 19 to open the valve 18 to permit sludge to flow from the sump at a greater rate. When the sludge level drops, the reduced hydrostatic pressure communicated through pipe 23 to the level control instrument 21 will cause throttling of the compressed air supply through pipe 20, permitting the valve 18 to move toward closed position, thus reducing the rate at which sludge is withdrawn from the sump 4. This insures that no distillate will be withdrawn through the sludge outlet. In order to insure that the settler is liquid-full when first placing the settler on stream, I open the valve 24 controlling a vent pipe 25. A gauge glass 26 is fitted which indicates a level of distillate within the settler. Any air or gas which is entrapped in the fluid being treated will accumulate at the top of the settler. This will lower the level of liquid within the settler, which will be indicated by a depression of the level of the liquid in the gauge glass 26. When this occurs, the valve 24 is opened, permitting the gas or air to be vented from the settler.

It will be apparent that I have accomplished the objects of my invention. I have provided a settler in which the flow of inlet fluid therethrough decreases at a constantly progressive rate and from which the lighter fluid separated by settling is withdrawn at such a rate as to preclude local areas of high velocity. The area of the separated sludge which may contact the distillate is kept at a minimum, preventing reaction at the interface between the separated sludge and the distillate. The arrangement is such as to preclude the withdrawal of distillate through the sludge outlet.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A settling apparatus for separating acid sludge from acid treated hydrocarbon oils, including in combination an elongated, horizontal vessel of substantially cylindrical cross sectional shape, said vessel being formed with an inclined bottom, a sump communicating with said vessel adjacent the low point of said bottom, an inlet pipe for leading a mixture of hydrocarbon oil and acid into the vessel, a first manifold communicating with said inlet pipe, a pair of manifolds communicating with said first manifold and a third manifold communicating with said pair of manifolds, said third manifold being positioned adjacent the bottom of said vessel and provided with outlet openings, an eduction manifold positioned adjacent the top of said vessel for removing hydrocarbon oil free of acid therefrom, an eduction pipe communicating with said sump, a valve controlling said eduction pipe, and means responsive to the hydrostatic pressure of liquid within said vessel for controlling said valve.

2. In a settler, a horizontal vessel of substantially circular cross sectional shape, an inlet pipe for introducing the liquid to be settled into said vessel, a first manifold communicating with said inlet pipe, a pair of manifolds communicating with said first manifold and a third manifold communicating with said pair of manifolds, said third manifold being positioned at a point adjacent the bottom of said vessel, outlet openings formed in said third manifold, an eduction manifold positioned adjacent the top of said vessel, a pair of manifolds communicating with said eduction manifold, a third manifold communicating with said pair of manifolds and an eduction pipe communicating with said third manifold, the construction being such that the liquid to be settled flows from said inlet pipe to said eduction pipe first at a progressively decreasing rate of flow until the point of the diameter of said vessel is reached and then flows at a progressively increasing rate of flow to said eduction pipe, with the avoidance of local areas of high velocity.

CHARLES W. STRATFORD.